United States Patent
Haymore

(10) Patent No.: US 6,231,756 B1
(45) Date of Patent: May 15, 2001

(54) ROTARY DISTRIBUTOR SPEED CONTROL SYSTEM FOR TRICKLING FILTERS

(75) Inventor: Ralph B. Haymore, Salt Lake City, UT (US)

(73) Assignee: WesTech, Inc., Salt Lake City, UT (US)

( * ) Notice: Subject to any disclaimer, the term of this patent is extended or adjusted under 35 U.S.C. 154(b) by 0 days.

(21) Appl. No.: 09/456,609

(22) Filed: Dec. 8, 1999

(51) Int. Cl.[7] ................................................ B01D 24/40
(52) U.S. Cl. ......................... 210/150; 210/97; 210/456; 210/541; 239/1; 239/71; 239/254; 239/256
(58) Field of Search .............................. 210/97, 145, 150, 210/151, 266, 291, 541, 739, 614, 617, 618, 662, 456, 85, 143, 542, 767; 239/1, 7, 71, 550, 254, 256–258

(56) References Cited

U.S. PATENT DOCUMENTS

| | | |
|---|---|---|
| 2,097,111 | 10/1937 | Walker . |
| 2,168,208 | 8/1939 | Jenks . |
| 2,301,025 | 11/1942 | Friend et al. . |
| 2,403,695 | 7/1946 | Walker et al. . |
| 2,429,312 | 10/1947 | Gillard . |
| 2,727,785 | 12/1955 | Kelly . |
| 2,779,732 | 1/1957 | Knowles . |
| 3,777,890 | 12/1973 | Hartley et al. ........................ 210/150 |
| 5,096,588 | 3/1992 | Albertson .............................. 210/150 |
| 5,103,864 | 4/1992 | Austin .................................. 210/150 |
| 5,160,435 | * 11/1992 | Albertson .............................. 210/150 |
| 5,167,833 | * 12/1992 | Solum et al. ......................... 210/739 |
| 5,190,644 | 3/1993 | Wisniewski .......................... 210/150 |

* cited by examiner

Primary Examiner—Joseph W. Drodge
(74) Attorney, Agent, or Firm—Shook, Hardy & Bacon LLP

(57) ABSTRACT

A rotary distributor speed control system that uses hydraulic forces is provided. This rotary distributor speed control system is part of a trickling filter used in wastewater treatment. The trickling filter includes a tank which is filled with a porous filter media, a center column that extends through the center of the tank and holds a feed pipe through which influent wastewater flows, and distribution arms that extend radially from the center well. Each distribution arm has a forward side and a reverse side. The forward side and the reverse side each define at least one orifice. Slide gates are coupled with the distribution arms, and these gates can be moved so as to cover the orifices. A slide gate valve operator is also coupled with each arm for mechanically moving the slide gates in response to a change in influent feed flow, a change in arm speed, or external conditions.

20 Claims, 5 Drawing Sheets

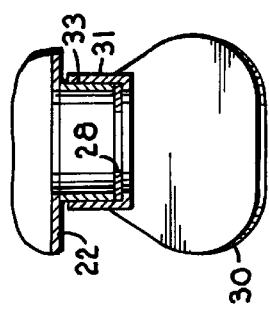
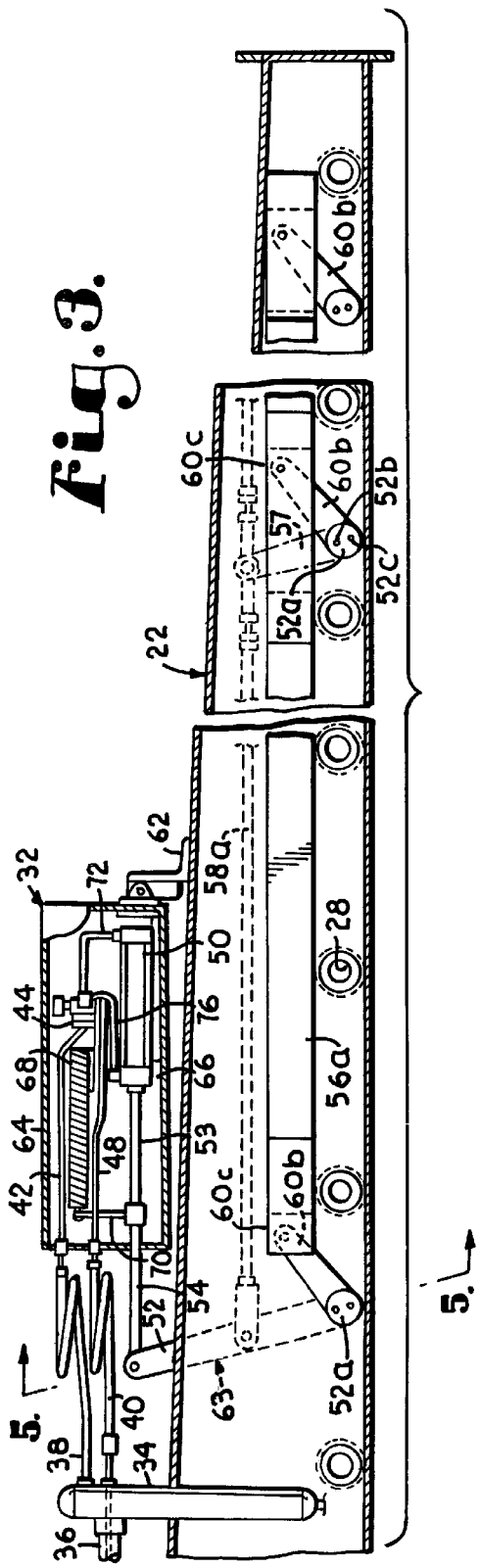
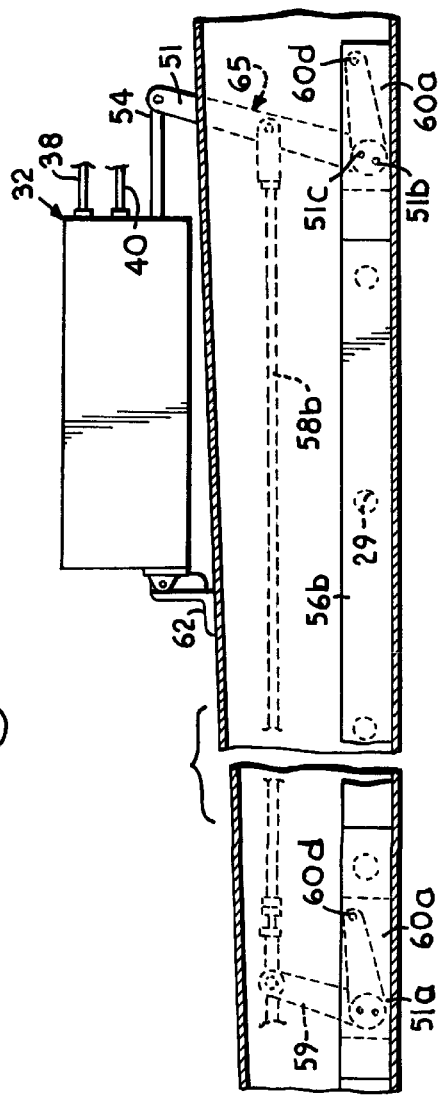

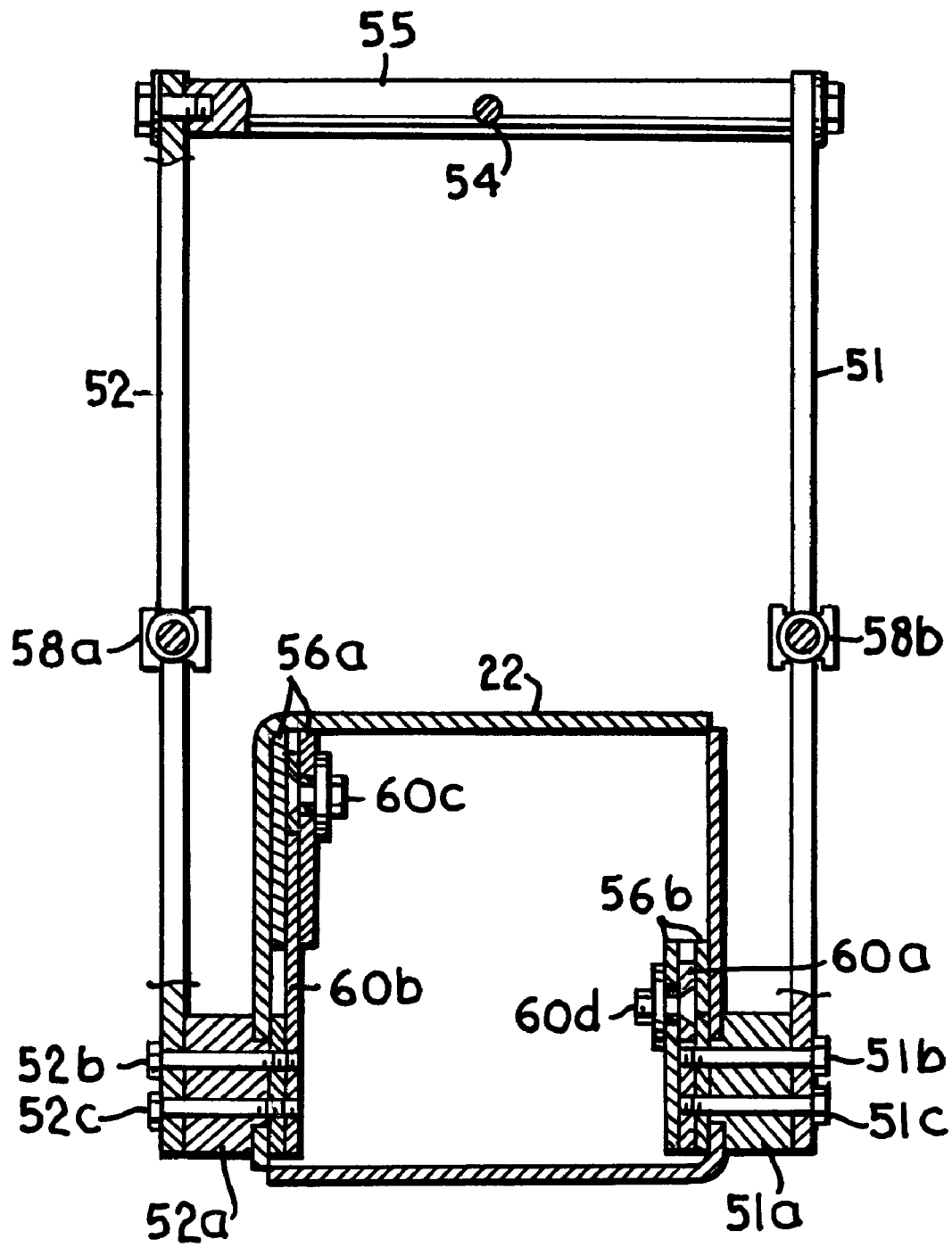

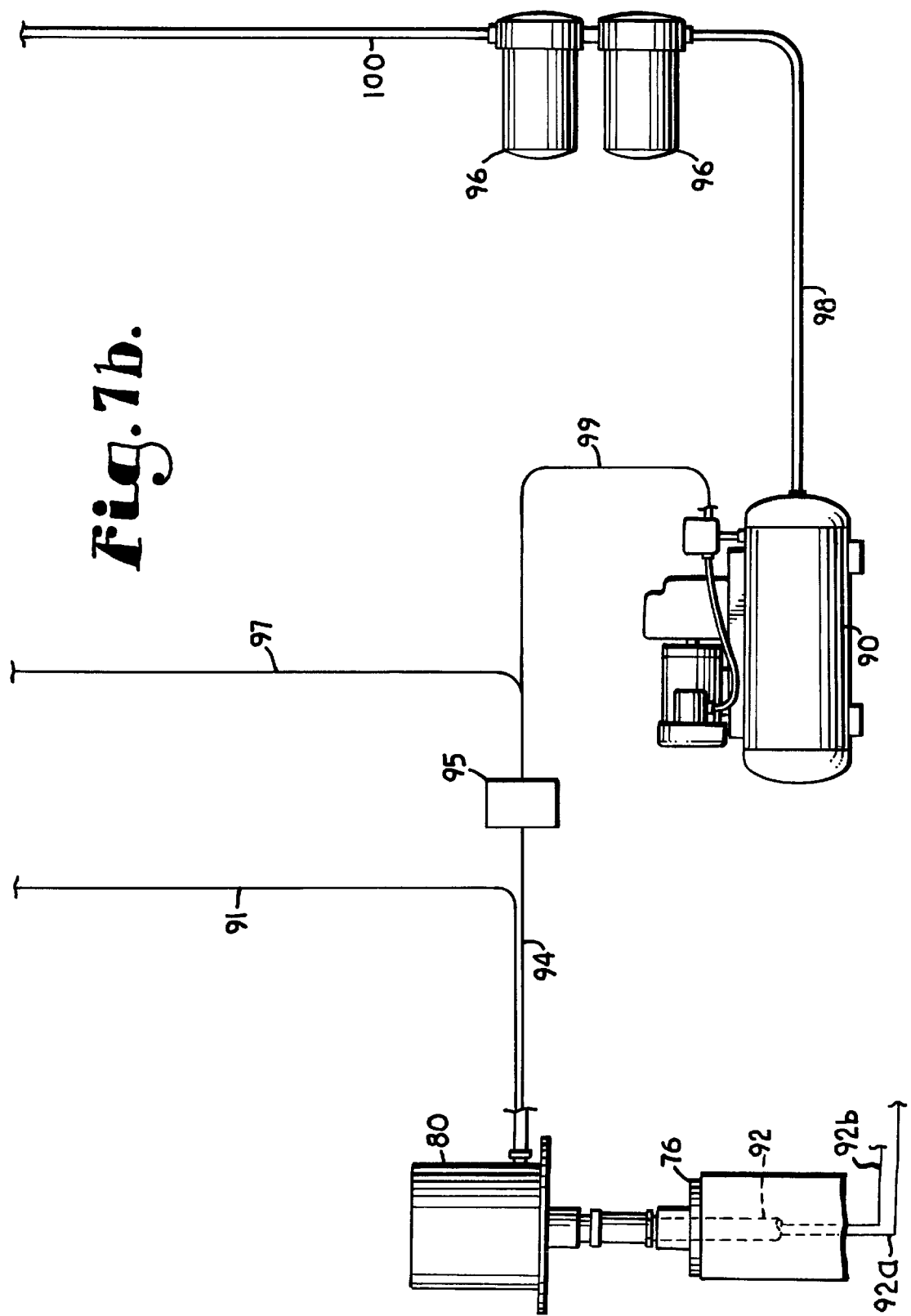

ROTARY DISTRIBUTOR SPEED CONTROL SYSTEM FOR TRICKLING FILTERS

CROSS REFERENCE TO RELATED APPLICATIONS

Not applicable.

BACKGROUND OF THE INVENTION

The present invention relates to a speed control system for a rotary distributor having multiple distribution arms that distribute waste water over a porous media of a trickling filter by discharging it through ports or nozzles spaced along the length of each distribution arm. The rotary distributor of the present invention uses hydraulic forces to control the rotational speed of the distribution arms.

Currently, when speed control is used, motor driven rotary distributors are commonly used to distribute waste water over porous media in trickling filter applications. A motor driven rotary distributor has a motor driven gear reducer that is mounted on the center column of the rotary distributor or on the end of one of the distribution arms. The motor has an adjustable speed controller so that the rotary distribution arms can be rotated at various desired speeds. When using a motor driven gear reducer, the hydraulic thrust normally associated with rotary distributors is nulled out by balancing the forward and reverse discharge from the arms so as to have a configuration that yields a near net zero thrust.

One disadvantage with motor driven rotary distributors is that they require significant amounts of energy from an outside source. Another disadvantage with motor driven rotary distributors is that larger units with higher flow rates become difficult to start and stop without damaging equipment.

Because the distribution arms are filled with water and may be up to 100 feet long, their mass creates a high moment of inertia that can lead to operating problems. When the arms are initially rotated from a rest condition, the strain placed on the gear reducer is significant, particularly if the acceleration is excessive. Therefore, the acceleration must be carefully controlled to prevent premature failure of the gear reduction mechanism. Conversely, if deceleration is not carefully controlled, the gear reducer can fail prematurely due to the friction, viscous drag and inertia of the motor and drive components. An over torque condition can destroy various parts of the system if an arm is caught on an obstruction. All of these potential problems can create situations where the treatment equipment is out of commission for an extended period, which may occur at an inappropriate time.

Prior to the addition of motor drives to rotary distributors, the distribution arms were designed to be rotatively driven by the hydraulic thrust produced by the discharging water. However, controlling the speed of the arms was difficult because it involved manually repositioning spreaders and caps along each arm so as to change the amount of forward and reverse discharge exiting the arms. Still another disadvantage with these manually controlled rotary distributors is that slow operating speeds, which sometimes are desirable, are difficult to achieve reliably because wind forces may work against the speed of the arms. In addition, a period of lower flows can cause the arms to stop moving when they are operating at low operating speeds, which is detrimental to the trickling filter performance.

In order to overcome these disadvantages, an improved speed control system for a rotary distributor is needed. This speed control should be able to use hydraulic forces to control the rotational speed of the distribution arms of the rotary distributor, thereby taking advantage of the hydraulic energy already present and eliminating the need for additional power.

SUMMARY OF THE INVENTION

It is an object of the present invention to provide hydraulic speed control for a rotary distribution arm arranged so that the system does not experience significant adverse effects from power failures, a change in influent feed flow, or a change in arm speed.

It is a further object of the present invention to provide a speed control system that is able to slow the distribution arm rotational speed below conventional speeds.

According to the present invention, the foregoing and other objects are achieved by a rotary distributor speed control system that uses hydraulic forces. This rotary distributor includes distribution arms each having a forward side and a reverse side wherein each of said forward sides and each of said reverse sides define at least one orifice, slide gates coupled with the arms wherein the gates can be moved so as to selectively cover the orifices, and slide gate valve operators coupled with each arm for moving the slide gates. Another aspect of the present invention is a method of controlling the speed of a rotary distributor by using hydraulic forces. Still another embodiment of the present invention is to provide an entire waste water treatment plant that uses the hydraulically controlled rotary distributor described above.

Additional objects, advantages and novel features of the invention will be set forth in part in the description which follows, and in part will become apparent to those skilled in the art upon examination of the following, or may be learned from practice of the invention. The objects and advantages of the invention may be realized and attained by means of the instrumentalities and combinations particularly pointed out in the appended claims.

BRIEF DESCRIPTION OF THE DRAWINGS

In the accompanying figures, which form a part of the specification and are to be read in conjunction therewith and in which like reference numerals are used to indicate like parts in the various views:

FIG. 3 is an enlarged cross-sectional view of a distribution arm of the rotary distributor of the preferred embodiment taken along line 3—3 of FIG. 1 with parts broken away to show details of construction;

FIG. 4 is an enlarged cross-sectional view of the distribution arm of the rotary distributor of the preferred embodiment taken along line 4—4 of FIG. 1 with parts broken away to show details of construction;

FIG. 5 is a cross-sectional view of the distribution arm of the preferred embodiment taken along line 5—5 of FIG. 3;

FIG. 6 is an enlarged fragmentary plan view of one of the spreaders adapted for use with the distributor shown in FIG. 1; and FIGS. 7a and 7b together form a schematic of the preferred embodiment of the rotary distributor speed control system of the present invention.

DETAILED DESCRIPTION OF THE PREFERRED EMBODIMENT

Figure 1:
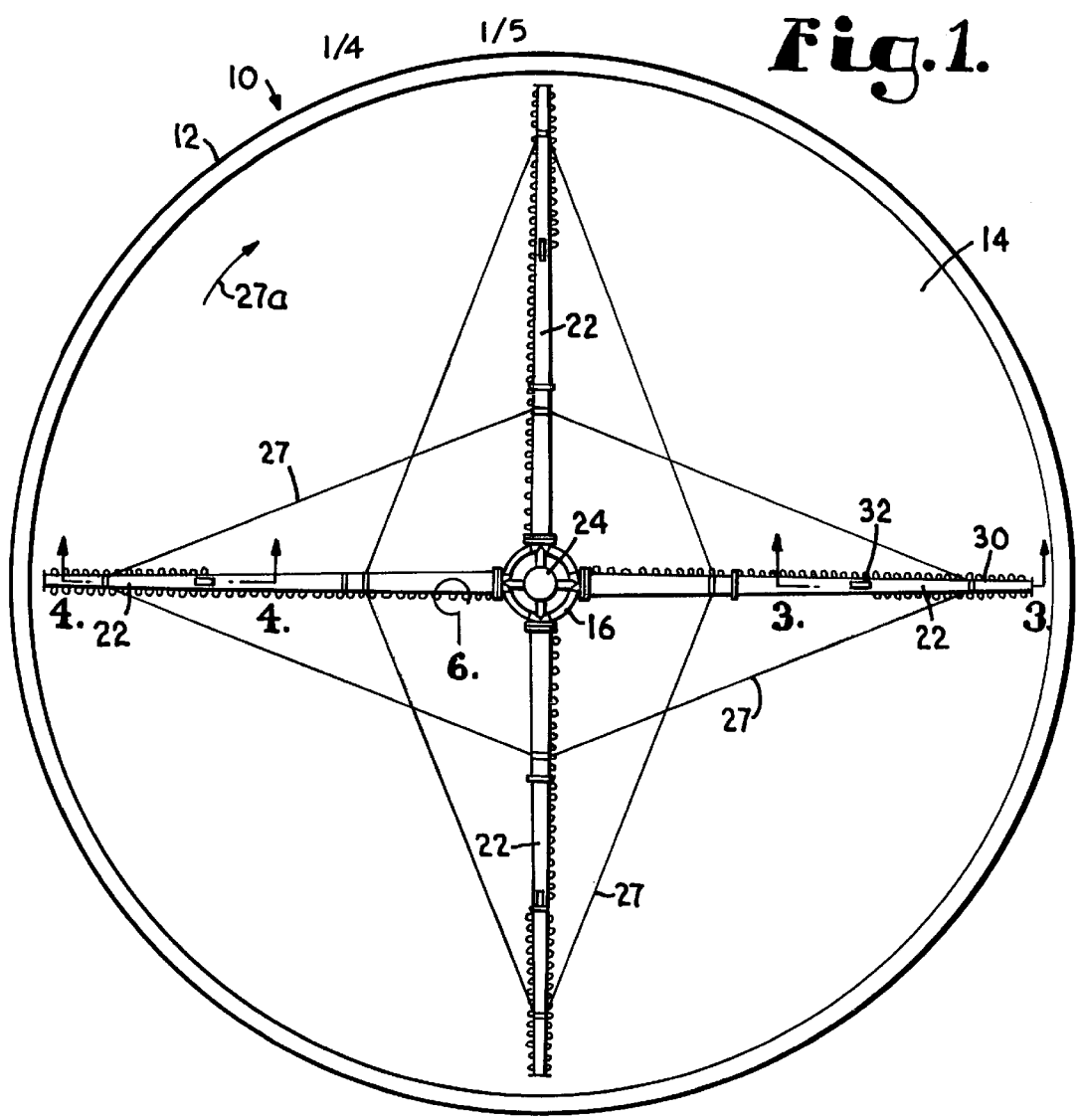
FIG. 1 is an overhead plan view of a rotary distributor constructed according to a preferred embodiment of the present invention.
Figure 2:
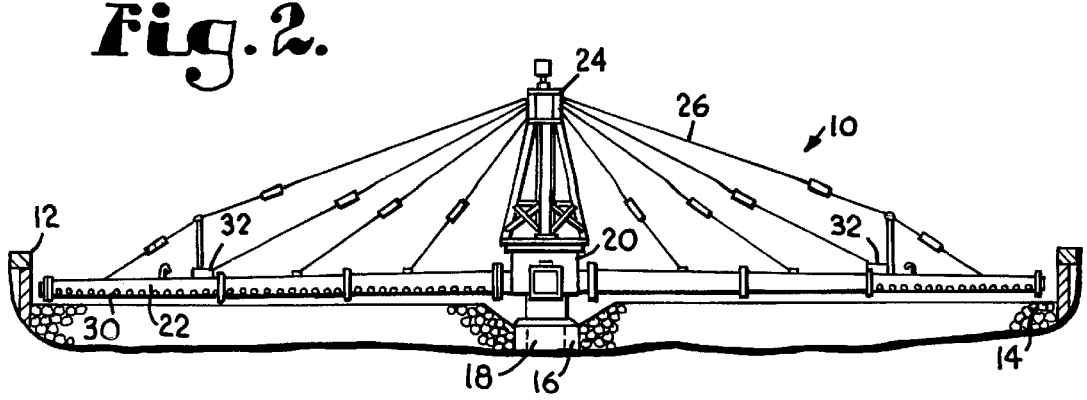
FIG. 2 is a side elevational view of the rotary distributor of the preferred embodiment of the present invention.

Referring initially to FIGS. 1 and 2, numeral 10 generally designates a trickling filter used in waste water treatment. The trickling filter 10 includes a tank 12 which is filled with a porous filter media 14, as shown in FIG. 2. A center column 16 extends through the center of tank 12 and holds a feed pipe 18 through which influent flows. Feed pipe 18 connects with a center well 20, and distribution arms 22 extend radially from center well 20. Each arm 22 is a hollow tube that is generally square in section and tapers as it extends outwardly from the center well 20. The center well 20 is surmounted by a tower 24 forming part of a rotary distributor mechanism, which includes the distribution arms. Tie rods 26 extend from the top of tower 24 to distribution arms 22 for vertical structural support. Horizontal rods 27 are used to connect the outer ends of distribution arms 22 to intermediate portions of adjacent distribution arms 22 for horizontal restraint.

The distribution arms 22 normally rotate in a forward direction which is the clockwise direction indicated by directional arrow 27a in FIG. 1. Each distribution arm 22 has a plurality of ports or orifices 28 spaced apart along the rear or trailing side of the arm, as shown in FIGS. 3 and 6. On the outer end portion of each arm 22, spaced apart ports or orifices 29, as shown in FIG. 4, are formed on the front or leading side of the arm. Spreaders 30, shown in FIG. 6, are fitted over the orifices 28 and 29 to provide a uniform distribution of water over porous filter media 14. Spreaders 30 each have an outer cap 31 that fits over a tube 33 that extends from arms 22, as shown in FIG. 6. As shown in FIG. 1, the front wall of distribution arm 22 is preferably provided with spreaders 30 and orifices 29 only on its outer end portion whereas the rear side of arm 22 has spreaders 30 and orifices 28 spaced generally uniformly throughout the entire length of the arm.

Each distribution arm 22 is provided with a slide gate valve operator 32 that simultaneously and proportionally gates and throttles waste water flow out of the orifices 28 and 29 to achieve the resulting thrusts that provide the desired distribution arm speed. Preferably, one of the slide gate valve operators 32 is mounted on the top surface of each arm 22, as shown in FIG. 2.

Figure 7A:
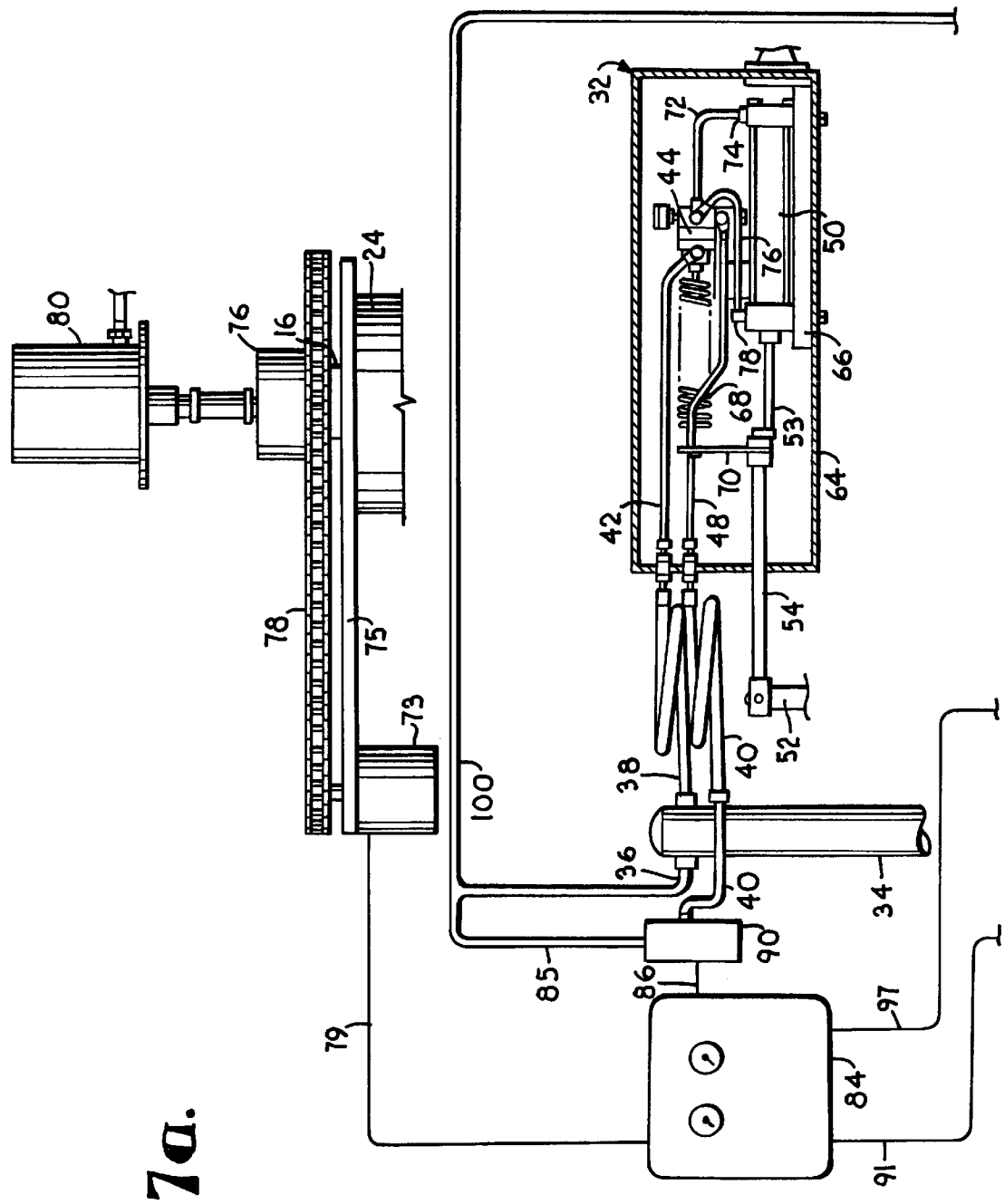

One of the slide gate valve operators 32 is shown in detail in FIG. 3. It is mounted on arm 22 by a bracket 62. A dripleg 34 provides a connection between an air supply line 36 and a hose 38. Line 36 receives a supply of air, as will be explained more fully, and sends the air through dripleg 34 and into hose 38. Condensation from the air can trickle to the bottom of dripleg 34. Hose 38 is coupled with a line 42, and line 42 is coupled with a positioner 44, which functions as a pilot operated valve. Positioner 44 connects with a pilot signal line that includes a hose 40 that rests within line 36 for structural support and a line 48 which connects with a signal port of positioner 44. Hose 40 is connected with an I/P transducer 90 which is controlled by an electrical signal from controller 84 through line 86. This is shown in FIG. 7a. Positioner 44 receives signals from line 48 and selectively directs air to a pneumatic cylinder 50 via lines 72 and 76.

Cylinder 50 has an extendable and retractable piston rod 53 which connects to an extension rod 54. As best shown in FIG. 5, the end of rod 54 connects with the center of a horizontal cross bar 55. The opposite ends of bar 55 connect with the upper ends of a pair of levers 51 and 52. The lower ends of levers 51 and 52 are connected with bushings 51a and 52a, respectively, and links 60a and 60b, respectively, by fasteners 51b, 51c, 52b, and 52c, which extend through the respective trailing and leading walls of the corresponding distribution arm 22. Bushings 51a and 52a extend inside of the arm 22 where they meet respective links 60a and 60b. As best shown in FIG. 3, link 60b is rigidly connected with lever 52 via bushing 52a and fasteners 52b and c, forming an acute angle. These pieces together form bellcrank 63. Similarly, as shown in FIG. 4, link 60a is rigidly connected with lever 51 at an acute angle via bushing 51a and fasteners 51b and c. These pieces together form bellcrank 65. Farther down arm 22 away from center well 20, links 60b are rigidly connected with short levers 57 via bushings 52a and fasteners 52b and c, as shown in FIG. 3. Similarly, short levers 59 are rigidly connected with links 60a via bushings 51a and fasteners 51b and c, as shown in FIG. 4.

A slide gate 56a for the trailing orifices 28 is pivotally connected with links 60b via bolts 60c (see FIG. 3). The middle of lever 52 is connected with a horizontal rod 58a. With continued reference to FIG. 3, in particular, the rod 58a is similarly connected with one or more additional short levers 57. The gate 56a is adjacent to the inside surface of the trailing wall of arm 22 and is moved upwardly and downwardly when the short levers 57 and lever 52 are pivoted by the extension and retraction of the piston rod 53 of cylinder 50. In the position shown in FIG. 3, with rod 53 fully extended, gate 56a is raised to its uppermost position, wherein the ports or orifices 28 are fully exposed to allow maximum discharge through them and maximum forward thrust applied to the distribution arm. When rod 53 is fully retracted, the bellcranks 63 and short levers 57 are pivoted in a clockwise direction as viewed in FIG. 3, and gate 56a is dropped to its lowermost position wherein the orifices 28 are all fully covered by the gate to prevent discharge through them. At intermediate positions of the piston rod 53, the gate 56a is between its extreme positions, and the orifices 28 are partially covered by the gate in accordance with its exact position.

The orifices 29 in the leading side of each arm 22 are provided with another slide gate 56b. With particular reference to FIG. 4, gate 56b is pivotally connected with one end of links 60a via bolts 60d. A rod 58b is connected with the center of lever 51 and to the end of short lever 59. Gate 56b is adjacent to the inside surface of the leading side of arm 22, as shown in FIGS. 4 and 5, where it can control the exposure of orifices 29. The lever 51 and short levers 59 for gate 56b are arranged so that when the other gate 56a is fully raised to expose orifices 28, gate 56b is fully lowered to completely cover orifices 29, as shown in FIG. 4. Conversely, when gate 56a is fully lowered to completely cover orifices 28, gate 56b is fully raised by lever 51 and short levers 59 to fully expose orifices 29. At intermediate positions of the piston rod 53, both gates 56a and 56b partially cover the orifices 28 and 29. When gate 56a is located to expose one third of each orifice 28, gate 56b is located such that two thirds of each orifice 29 is exposed. In this way, the gates 56a and 56b are arranged to be out of phase. The parallel links (60b for gate 56a and 60a for gate 56b) serve to provide a parallelogram linkage that maintains each gate 56a and 56b horizontal at all times so that all of the orifices 28 are equally exposed and all of the orifices 29 are equally exposed at any selected time.

Gates 56a and 56b are each comprised of two rectangular strips, as shown in FIG. 5, which are bolted together with a spacer between the two strips. The spacer and bolts are not shown. The first strip extends in one direction from the spacer and is located against the arm wall. The second strip extends from behind the spacer in the opposite direction from the first piece. Because the gates are made of multiples pieces, as shown by the broken lines on the gates in FIGS. 3 and 4, when the bellcranks and the short levers rotate, the gates are able to be lowered into the space behind the first strips of the gates.

It is also noted that the distance the piston rod 53 is extended is directly proportional to the pressure applied to the signal line 48 for positioner 44. By way of example, the piston rod 53 may have a six inch stroke and the pressure range on line 48 may be 3–15 psig. Each psig applied to line 48 above 3 psig effects extension of rod 53 by one half inch in this situation. Thus, when 9 psig is applied as a pressure signal to line 48 by the I/P transducer 90 that receives an electrical signal from controller 84, rod 53 is extended 3 inches, or half its total stroke. Then, orifices 28 are half exposed, and orifices 29 are also half exposed.

As best shown in FIG. 7a, cylinder 50 is mounted in an enclosure 64 of slide gate valve operator 32 on a mounting bracket 66. A tension spring 68 is connected between positioner 44 and an arm 70 and extends and retracts with rod 53. Spring 68 provides position feedback to positioner 44 of the extent of the stroke of rod 53. An air line 72 leads from positioner 44 to a cylinder port 74 at the base of cylinder 50. Another line 76 leads from positioner 44 to a port 78 located at the rod end of cylinder 50.

Speed control feedback for the slide gate valve control 32 is provided by a tachometer generator 73 mounted to a plate 75 that is connected with tower top 24. The tachometer generator 73 is driven by a belt and sheave reduction 78 which is in turn driven by the rotary tower top 24. A fixed mast column 76 is coupled with center column 16, and extends up through the center of the center well 20 and tower 24. Fixed mast column 76 is also coupled with slip ring assembly 80. The electrical output signal from the tachometer generator 73 is applied to line 79 and is transmitted to controller 84. Controller 84 provides an electrical signal via line 86 to I/P transducer 90, which then provides a pressure signal in a selected range such as 3–15 psig to line 40. The magnitude of the pressure signal sent in line 40 is directly proportional to the electrical signal from line 86.

The controller 84 compares the electrical signal from line 79 with a set point electrical signal from a line 91 which leads to controller 84. Controller 84 also receives another electrical signal in line 97 which is used as the power source for the signal exiting in line 86. If the signal in line 79 is not within a selected deviation from the set point (line 91), controller 84 sends a correcting signal to the control line 86, which communicates with positioner 44. Control line 86 then enters I/P transducer 90, where the electrical signal from line 86 is converted to a pressure signal. I/P transducer 90 receives air from line 85 and a pressure signal exits the I/P transducer through line 40. The pressure signal is then sent through line 48 to positioner 44. Positioner 44 then applies air to the appropriate cylinder port 74 or 78 to extend or retract rod 53 a distance to move slide gates 56a and b and create a propelling thrust change that will make the distribution arm 22 speed up or slow down. This change will occur until the signal from line 79 agrees with the set point signal from line 91 within the preselected tolerance.

As shown in FIG. 7b, a signal from a remote control center (not shown) and the power for an air compressor 93 are applied through a conduit 92 on lines 92a and 92b, respectively. The conduit 92 extends in the fixed mast column 76. The electrical lines 92a and 92b are applied to slip ring assembly 80 on the top of fixed mast column 76. A control signal (the set point signal) on line 92a is sent to line 91. A second signal exits slip ring assembly 80 through line 94. It then enters transformer 95. The electrical line exiting transformer 95 branches into line 97 and line 99. Controller 84 receives current from electrical line 97. Air compressor 93 receives operating power from slip ring assembly 80 via a line 99. Air compressor 93 supplies air to filters 96 via a line 98. Air exits filters 96 in a line 100 and connects with line 85, which supplies air to transducer 90, and with line 36, which supplies air to line 38. The I/P transducer 90 converts the supply pressure in line 85 to, for example, a 3 to 15 psig set point air signal that is transmitted via line 40 to positioner 44. The pressure in line 40 is directly proportional to the current (or other parameter) of the signal in line 86 (which may be in the range of 4–20 mA, for example).

The rotary distributor operates hydraulically by water being pumped up through feed pipe 18 and into center well 20. Center well 20 directs the flow of the water radially outwardly into each distribution arm 22. The rotary distributor may have two or more arms 22 and preferably has four arms 22. As the flow moves outwardly, it is throttled out and spread by each orifice 28 and 29 and spreader 30 along the length of each distribution arm and so that the effluent is spread uniformly and falls on porous filter media 14. The flow then trickles down through porous filter media 14 to the bottom of tank 12 where it is collected and sent to the next stage of processing.

The rotary distributor of the present invention uses hydraulic forces to control the rotational speed of its distribution arms 22. This is done by selectively controlling the size of the ports or orifices 28 and 29 through which water is discharged in order to control the forward and reverse thrust forces applied by liquid exiting the arm and thereby control the rotational speed of the distribution arm assembly. Ports or orifices 28 are located on both the forward and reverse sides of each distribution arm 22. When all of the liquid is directed out through the ports on the reverse or trailing sides of the arms, maximum forward thrust is provided. Conversely, when all of the water is discharged through the oppositely oriented ports, which are on the forward side of the arms, maximum reverse thrust is provided. Thrusts between these extremes are provided by adjusting the slide gates to intermediate positions.

By proportionally throttling the discharged water from the arm 22 between the front orifices 29 (reverse thrusting) and the rear orifices 28 (forward thrusting) of the rotary distribution arms 22, the arm speed is controlled as desired. The rotary distributor dispenses and distributes water to the trickling filter 14. The throttling of the discharge from the front orifices 29 to the back orifices 28 alters arm 22's propelling thrust and causes its speed to increase or decrease. Changing the speed is desired in some processes during selected intervals to allow for optimization of the water treatment process and maintenance of the trickling filter media 14.

This invention provides a speed control means using existing propulsion means without the problems associated with a mechanical drive system. The system of the present invention cannot experience catastrophic failures due to a power failure, an increase in or loss of influent feed flow, or a high acceleration or deceleration of the arms. The arms remain free to rotate and respond to the hydraulic thrust or loss of thrust without concern of any mechanical failure. Still further, the rotary distributor mechanism of the present invention can be easily retrofit to existing distribution arms.

Control of the exposure of the orifices 28 and 29 is effected by sliding gates 56a and 56b. Preferably gates 56a and 56b are located and arranged so that all of the orifices on one side of each arm 22 are covered or uncovered to the same extent. The speed of arms 22 is controlled by directing the flow of the waste water to either the forward or reversing orifices using the slide gates. The slide gates may operate in a vertical direction as shown and described, or they may move horizontally or in another direction. Preferably, slide gates operate in a vertical direction, as shown in the drawings. The slide gate's movement can be controlled by air, an electric actuator, or any other suitable type of power source. The gates 56 are arranged via levers 51 and 52 and bar 55 so that when the orifices 28 on the trailing side of an arm 22 are completely covered, the orifices 29 on the front side are completely uncovered and vice-versa. It is also possible to partly expose the orifices 28 on one side and partly expose the orifices 29 on the opposite side to the same or to a different extent, depending upon the exact thrust that is desired.

One of the slide gate valve operators 32 and its control system are shown in FIGS. 7a and b. Two air sources are connected to this slide gate valve operator 32, the operating air source and the controlling signal air. The operating air source may be about 80 psig and is received from line 36. The controlling signal air may be between about 3 and 15 psig and is received from line 40. The positioner feedback spring 68 is selected to match the cylinder 50's stroke. Cylinder 50 should be a double acting cylinder.

When air is applied to first cylinder port 74 of the double acting cylinder 50, piston rod 53 extends and pushes rod 54 so as to pivot bellcranks 63 and 65. This raises slide gate 56a and lowers gate 56b. When air is applied to second cylinder port 78, piston 53 is retracted back into the cylinder 50, pulling rod 54 toward the cylinder and moving bellcranks 63 and 65 so as to lower slide gate 56a and raise gate 56b. The two gates 56a and 56b are moved simultaneously the same distance but in the opposite direction.

The control system for the slide valve operator can be an automatic control with feedback that uses both electrical and pressure signals, as shown in FIGS. 7a and b. Alternatively, the control system can be fluidly operated, operated using electrical positioners and electronic controls (not shown), operated with a timer and solenoid system (not shown), or operated with any other type of suitable control arrangement. The timer and solenoid system may have a solenoid and pressure regulator for each speed needed. Each pressure regulator may be manually preset to the corresponding pressure that gives the desired rotational speed and may be connected to a common manifold and to the signal air port of the positioner.

Another embodiment of this invention involves using hydraulic energy to control the speed along with a brake located at the center of the mechanism. The brake can be hydraulic or pressure sensitive with its entire function to slow the rotation of the arms.

From the foregoing, it will be seen that this invention is one well adapted to attain all the ends and objects hereinabove set forth together with other advantages which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth is to be interpreted as illustrative and not in a limiting sense.

I claim:

1. A rotary distributor of waste water, comprising:
    at least one distribution arm having a forward side and a reverse side, wherein said forward side and said reverse side each define at least one orifice;
    each distribution arm having at least one slide gate coupled with said arm wherein said gate can be moved so as to cover said at least one orifice; and
    said at least one slide gate of each arm having a slide gate valve operator coupled with said slide gate for moving said slide gate.

2. The rotary distributor of claim 1, wherein said forward side and said reverse side each define a plurality of orifices and wherein said slide gate is able to simultaneously cover a plurality of orifices.

3. The rotary distributor of claim 2, wherein said distributor has at least two distribution arms and wherein the forward side and the reverse side each define a plurality of orifices.

4. The rotary distributor of claim 3, further comprising:
    a plurality of spreaders coupled with said distribution arms and placed over said plurality of orifices.

5. The rotary distributor of claim 4, wherein said distributor has more than two distribution arms.

6. The rotary distributor of claim 3, wherein a first slide gate is coupled with said forward side of said arm and a second slide gate is coupled with said reverse side of said arm and wherein said first and second slide gates are moved in opposite directions at the same time by said slide gate valve operator.

7. The rotary distributor of claim 6, wherein said first slide gate is able to be lowered so as to cover said orifices on said forward side while said second slide gate is raised exposing said orifices on said reverse side.

8. The rotary distributor of claim 3, wherein said slide gate valve operator comprises a positioner for receiving control signals and sending operating signals, a cylinder that receives said operating signals from said positioner, a piston rod that is coupled with and is moved by said cylinder in response to said operating signals, and a bellcrank coupled with said piston rod and said slide gate and which moves said slide gate in response to motion from said piston rod.

9. The rotary distributor of claim 8, wherein said piston rod extends proportionally in response to an extent set by said positioner in response to an air signal sent from a controller.

10. The rotary distributor of claim 9, further comprising:
    a center well coupled with said distribution arms;
    a tower coupled with said center well; and
    tie rods coupled with said distribution arms and said tower.

11. The rotary distributor of claim 10, wherein said slide gate valve operator is further comprised of an air compressor, a tachometer generator providing electrical output that is reflective of the rotational speed of said distribution arms, a controller that receives said electrical output from said tachometer generator and a controlling set point electrical signal and that produces a responding output electrical signal, an I/P transducer for receiving said responding output electrical signal from said controller and air from said air compressor and for sending an output air signal that corresponds with said responding output electrical signal to said positioner, wherein said controller compares said output from said tachometer generator with said controlling set point electrical signal and modifies said output electrical signal sent to said I/P transducer in response to the difference between said output from said tachometer generator and said control set point air signal, and wherein said slide gate is moved by said cylinder in response to said responsive output air signal from said I/P transducer.

12. The rotary distributor of claim 10, wherein said slide gate valve operator is further comprised of an air compressor, a pressure controller that receives a set point electrical signal and produces a responding output electrical signal, a tachometer generator providing electrical output to said pressure controller that is reflective of the rotational speed of said distribution arms, and an I/P transducer for receiving said responding signal from said pressure controller and producing a corresponding pressure signal that is sent to said positioner, wherein said pressure controller compares said electrical output from said tachometer generator with said set point electrical signal and modifies said responding output electrical signal sent to said positioner in response to the difference between said electrical output signal from said tachometer generator and said set point electrical signal and wherein said slide gate is moved by said cylinder in response to said responding output signal.

13. A method of controlling the speed of a rotary distributor that receives waste water, comprising:

providing at least one distribution arm having a forward side and a reverse side each defining at least one orifice;

coupling at least one slide gate with at least one of said distribution arms;

coupling a slide gate valve operator with at least one of said slide gates; and moving said slide gate over said orifice using said slide gate valve operator so as to adjust the speed of said distribution arm.

14. The method of claim 13, wherein said slide gate is moved in response to a flow rate of said waste water into said distributor.

15. The method of claim 13, wherein a first slide gate is coupled with said forward side of said arm and a second slide gate is coupled with said reverse side of said arm and wherein said first and second slide gates are moved in opposite directions at the same time by said slide gate valve operator.

16. A waste water treatment plant, comprising:

a tank;

filtering media held within said tank;

a feed pipe extending through said tank; and a rotary distributor coupled with said feed pipe wherein said distributor is comprised of at least two distribution arms each having a forward side and a reverse side that each define at least one orifice, at least one slide gate coupled with each of said arms for covering said orifices, and a slide gate valve operator coupled with said at least one slide gate of each of said arms for controlling the movement of said slide gates.

17. The waste water treatment plant of claim 16, wherein said tank has a center column and said feed pipe is held in said center column.

18. The waste water treatment plant of claim 16, wherein said slide gate valve operator comprises a positioner for receiving control signals and sending operating signals, a cylinder that receives said operating signals from said positioner, a piston rod that is coupled with and is moved by said cylinder in response to said air signals, and a bellcrank coupled with said piston rod and said slide gate and which moves said slide gate in response to motion from said piston rod.

19. The waste water treatment plant of claim 18, wherein said slide gate valve operator is further comprised of an air compressor, a pressure controller that receives a set point electrical signal and produces a responding output electrical signal, a tachometer generator providing electrical output to said pressure controller that is reflective of the rotational speed of said distribution arms, and an I/P transducer for receiving said responding output signal from said pressure controller and producing a corresponding pressure signal that is sent to said positioner, wherein said pressure controller compares said electrical output from said tachometer generator with said set point electrical signal and modifies said responding output signal sent to said positioner in response to the difference between said electrical output signal from said tachometer generator and said set point electrical signal and wherein said slide gate is moved by said cylinder in response to said responding output electrical signal.

20. The waste water treatment plant of claim 18, wherein said slide gate valve operator is further comprised of an air compressor, a tachometer generator providing electrical output that is reflective of the rotational speed of said distribution arms, a controller that receives said electrical output from said tachometer generator and a controlling set point electrical signal and that produces a responding output electrical signal, and an I/P transducer for receiving said responding output electrical signal from said controller and air from said air compressor and for sending an output air signal that corresponds with said responding output electrical signal to said positioner, wherein said controller compares said output from said tachometer generator with said controlling set point electrical signal and modifies said output electrical signal sent to said I/P transducer in response to the difference between said output from said tachometer generator and said control set point air signal, and wherein said slide gate is moved by said cylinder in response to said responding output air signal from said I/P transducer.

* * * * *